(12) United States Patent
Kamakura

(10) Patent No.: US 11,953,694 B2
(45) Date of Patent: Apr. 9, 2024

(54) HEAD-MOUNTED DISPLAY APPARATUS

(71) Applicant: SEIKO EPSON CORPORATION, Tokyo (JP)

(72) Inventor: Kazuya Kamakura, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 345 days.

(21) Appl. No.: 17/211,883

(22) Filed: Mar. 25, 2021

(65) Prior Publication Data

US 2021/0302762 A1    Sep. 30, 2021

(30) Foreign Application Priority Data

Mar. 26, 2020    (JP) .................................. 2020-055575

(51) Int. Cl.
G02B 27/01    (2006.01)

(52) U.S. Cl.
CPC .. *G02B 27/0176* (2013.01); *G02B 2027/0169* (2013.01); *G02B 2027/0178* (2013.01)

(58) Field of Classification Search
CPC ........ G02B 27/0176; G02B 2027/0169; G02B 2027/0178; G02B 2027/0138; G02C 5/146; G02C 11/10
See application file for complete search history.

(56) References Cited

U.S. PATENT DOCUMENTS

| | | | | |
|---|---|---|---|---|
| 2010/0073262 | A1* | 3/2010 | Matsumoto | G02B 27/0176 345/8 |
| 2012/0200477 | A1* | 8/2012 | Fujishiro | G02B 27/0176 345/8 |
| 2014/0340285 | A1* | 11/2014 | Hiraide | G02B 27/0172 345/8 |
| 2017/0184862 | A1* | 6/2017 | Miyao | G02B 6/0001 |
| 2018/0173017 | A1* | 6/2018 | Imagawa | G02B 27/0176 |
| 2019/0235254 | A1 | 8/2019 | Kamakura | |

FOREIGN PATENT DOCUMENTS

| | | |
|---|---|---|
| CN | 203930212 | 11/2014 |
| JP | 2015108798 | 6/2015 |
| JP | 2019129484 | 8/2019 |
| WO | 2017126583 | 7/2017 |

* cited by examiner

*Primary Examiner* — George G. King
(74) *Attorney, Agent, or Firm* — JCIPRNET

(57) ABSTRACT

A right temple member and a left temple member are provided, close to a display unit, at inner side faces of a right case member and a left case member that store at least a part of the display unit. A right support member and a left support member are provided at the right temple member and the left temple member. Accordingly, the provision of the right support member and the left support member enables to adjust a degree of opening and an inward repulsive force of the right temple member and the left temple member.

8 Claims, 11 Drawing Sheets

HEAD-MOUNTED DISPLAY APPARATUS

The present application is based on, and claims priority from JP Application Serial Number 2020-055575, filed Mar. 26, 2020, the disclosure of which is hereby incorporated by reference herein in its entirety.

BACKGROUND

1. Technical Field

The present disclosure relates to a head-mounted display apparatus.

2. Related Art

In the related art, there in known a head-mounted display apparatus mounted on the head of a user to be used and configured to display an image in a manner visually recognizable by the user. As such a head-mounted display apparatus, a head-mounted display apparatus equipped with a pair of temple portions suspended on the right and left ears of the user is known. In this case, when the user is using glasses, the head-mounted display apparatus needs to be worn on the glasses that is used.

In the related art, there is disclosed a protective eyewear that is attachable to a glass frame of the user (for example, see JP 2015-108798 A).

A technology described in JP 2015-108798 A is merely a technology for mounting, on the glasses, a protective eyewear body constituted of a rim, a lens, and a bridge, and is not applicable to a head-mounted display apparatus including a display unit and a temple member.

Further, the applicant has developed a technology in which a temple member is provided at an end portion of a rear side of a case member that stores a part of a display unit and a support member that abuts against the glass frame to prevent displacement of the head-mounted display apparatus is removably provided on a side face of the case member.

However, in such a technology, the temple member is provided at the end portion of the rear side of the case member, thus, only a leading end portion of the temple member may abut depending on a shape of the head.

The present disclosure has been made in light of the above-described points, and aims to provide a head-mounted display apparatus that can improve wearing properties even when glasses are used.

SUMMARY

In a head-mounted display apparatus according to the present disclosure, a first temple member and a second temple member are provided, close to a display unit, at an inner side face of a case member that stores at least a part of the display unit, and a first support member and a second support member are provided at the first temple member and the second temple member.

DESCRIPTION OF EXEMPLARY EMBODIMENTS

Hereinafter, preferred embodiments of the present disclosure will be described with reference to the drawings. Note that the embodiments described below are not intended to unjustly limit the content of the present disclosure recited in the claims. Also, all of the configurations described below are not necessarily essential constituent requirements of the present disclosure.

Figure 1:
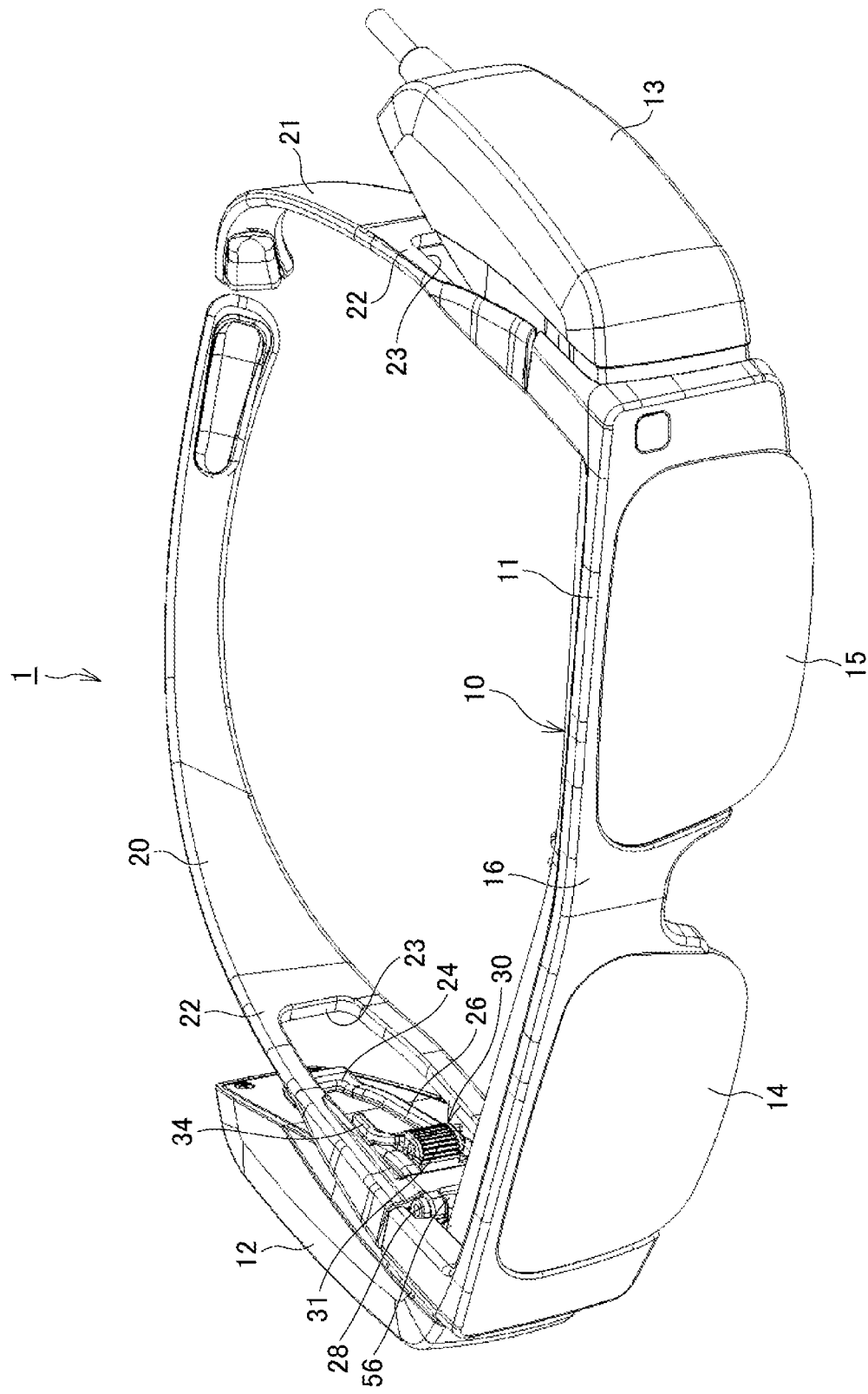
FIG. 1 is a perspective view of a second position state in a first embodiment.
Figure 2:
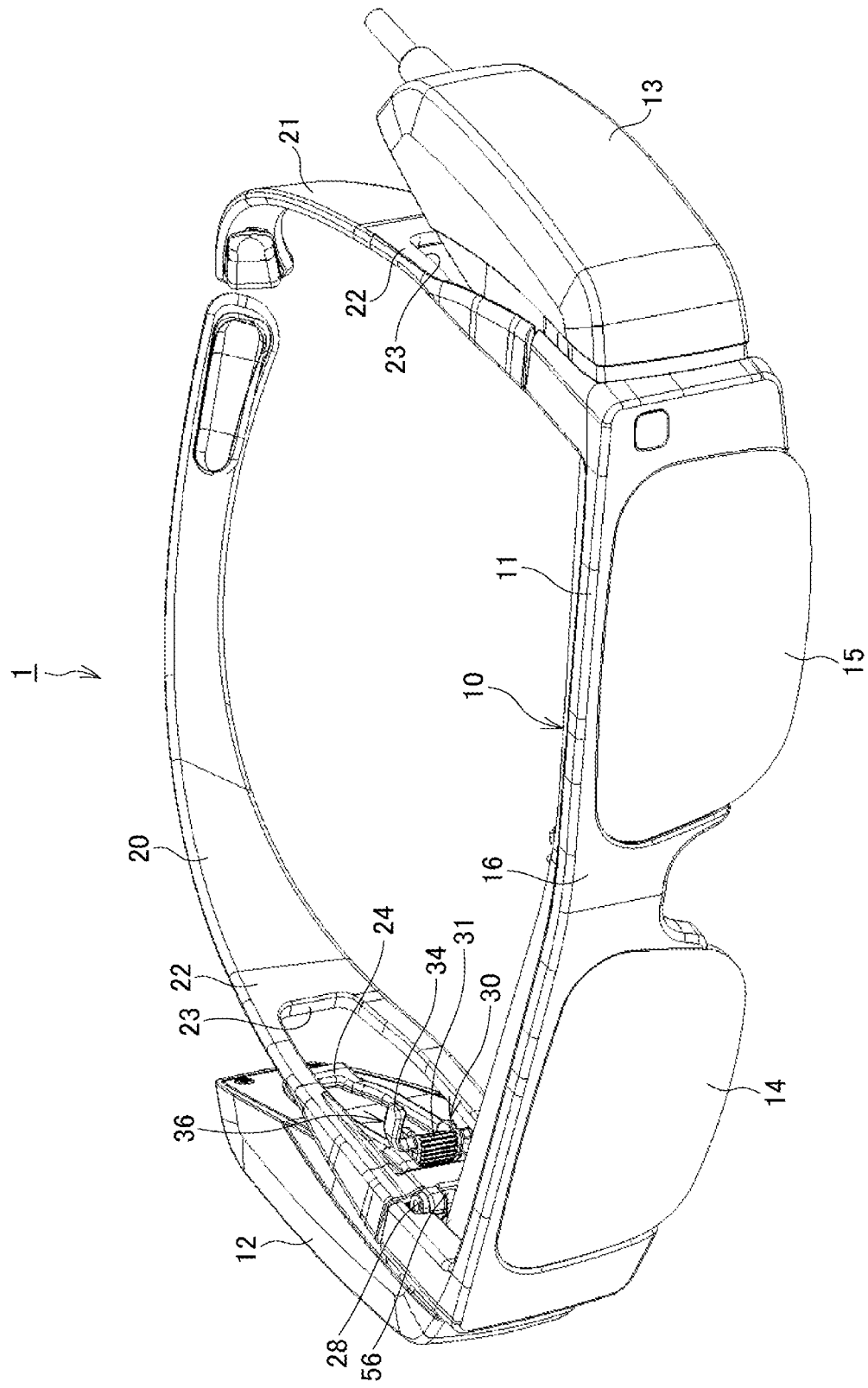
FIG. 2 is a perspective view of a first position state in a first embodiment.
Figure 3:
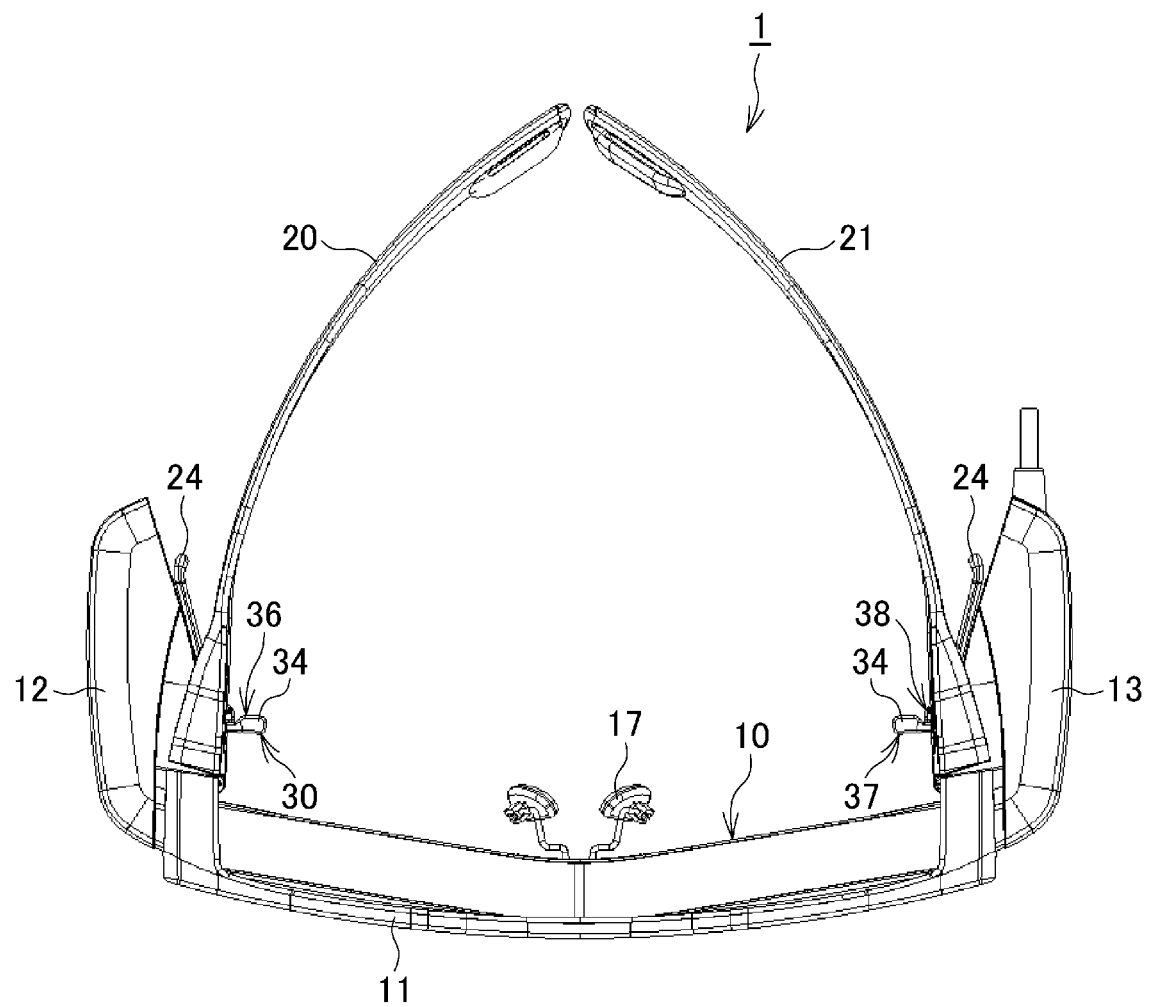
FIG. 3 is a plan view in a first embodiment.
Figure 4:
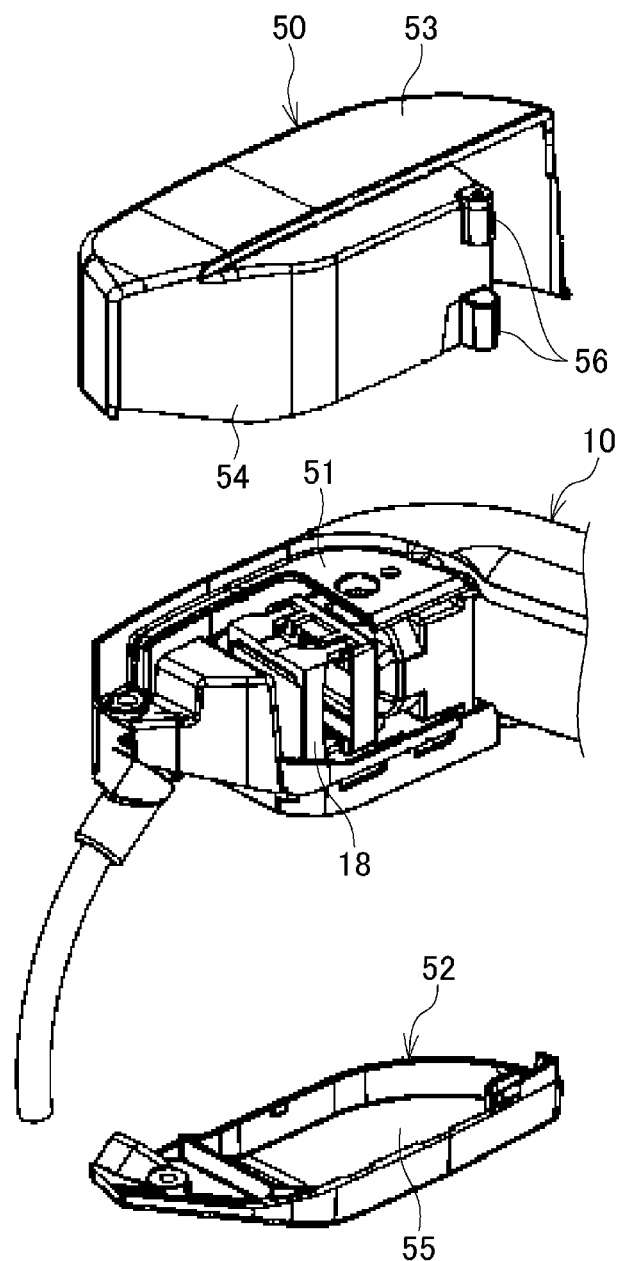
FIG. 4 is an exploded perspective view of a left case member portion in a first embodiment.
Figure 5:
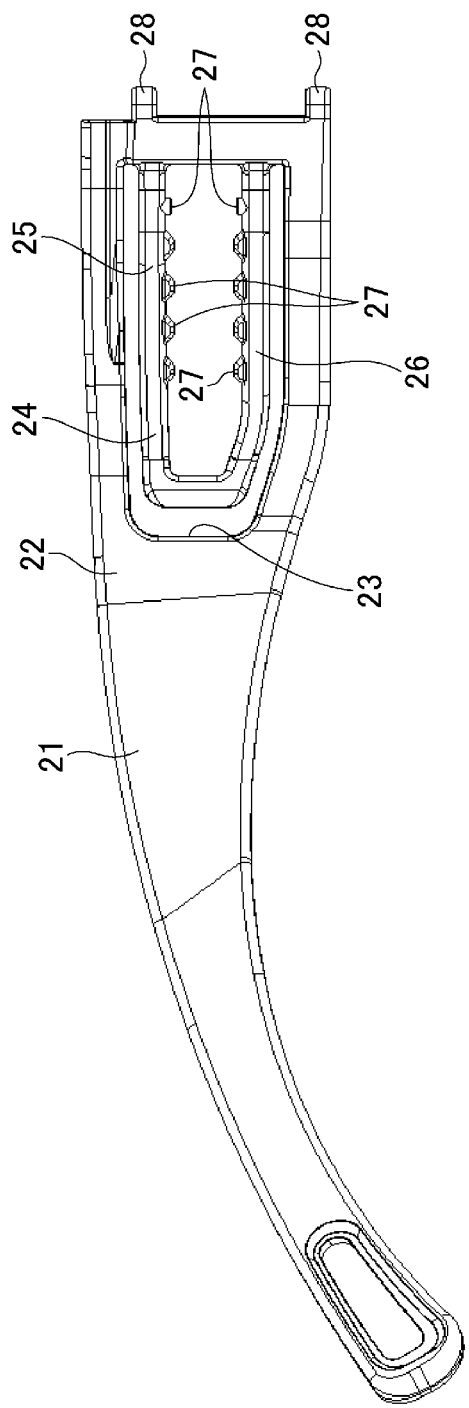
FIG. 5 is a front view illustrating a temple member in a first embodiment.
Figure 6:
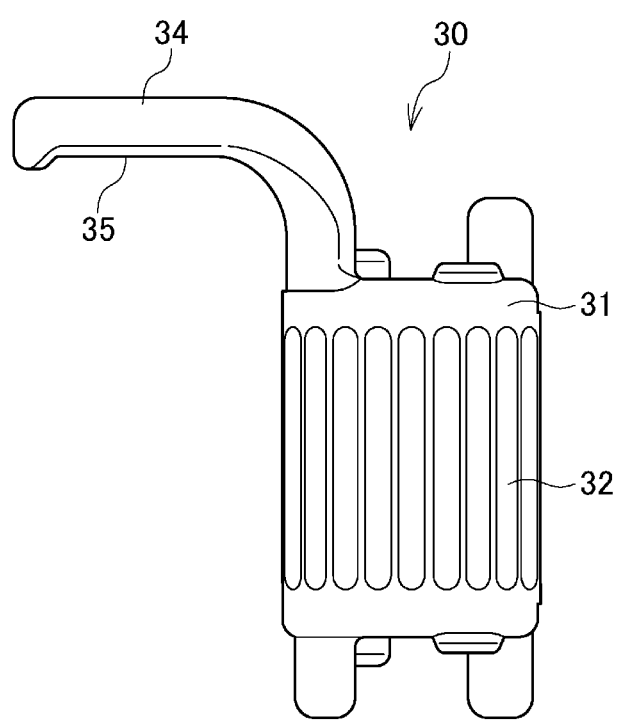
FIG. 6 is a front view illustrating a support member in a first embodiment.

FIG. 1 is a perspective view illustrating a head-mounted display apparatus (abbreviated as HMD below) of a second position state in a first embodiment to which the present disclosure is applied. FIG. 2 is a perspective view of a first position state in the first embodiment. FIG. 3 is a plan view illustrating the first embodiment. FIG. 4 is an exploded perspective view of a left case member portion in the first embodiment. FIG. 5 is a front view illustrating a temple member in the first embodiment. FIG. 6 is a front view illustrating a support member in the first embodiment.

An HMD 1 includes a display 10 that allows a user in a state of wearing the HMD 1 on the head of the user to view a virtual image.

The display 10 is a head-mounted body with glasses shape worn by the user on the head, and is configured to enable transmission of outside light. The display 10 includes a right case member 12, a left case member 13, a right light-guiding plate 14, and a left light-guiding plate 15 that constitute a display unit at a main body including a right temple member 20 as a first temple member, a left temple member 21 as a second temple member, and a front portion frame 11.

The right temple member 20 and the left temple member 21 extend rearward from both end portions of the front portion frame 11, respectively, and hold the display 10 to the head of the user just like temple portions of glasses.

The right temple member 20 is provided, in a wearing state of the display 10, extending from an right end portion of the front portion frame 11 to a position corresponding to a right-side head part of the user. The left temple member 21 is provided, in the wearing state of the display 10, extending from a left end portion of the front portion frame 11 to a position corresponding to a left-side head part of the user.

The right light-guiding plate 14 and the left light-guiding plate 15 are provided at the front portion frame 11. The right light-guiding plate 14 is located in front of the right eye of the user in the wearing state of the display 10, and allows the user to visually recognize an image with the right eye. The left light-guiding plate 15 is located in front of the left eye of the user in the wearing state of the display 10, and allows the user to visually recognize the image with the left eye.

The front portion frame 11 includes a bridge 16 coupling an end of the right light-guiding plate 14 and an end of the left light-guiding plate 15 with each other. The bridge 16 lies between the eyebrows of the user in a wearing state where the user wears the display 10. The front portion frame 11 is provided, at a position at which the right light-guiding plate 14 is coupled with the left light-guiding plate 15, with a nose pad portion 17 abutting against the nose of the user in the wearing state of the display 10.

This allows the nose pad portion 17, the right temple member 20, and the left temple member 21 to hold the display 10 to the head of the user. In addition, a belt (not illustrated) that is in contact with a back of the head of the user in the wearing state of the display 10 may be coupled to the right temple member 20 and the left temple member 21. In this case, the belt can hold the display 10 to the head of the user.

The right case member 12, which is a display unit related to image display by the right light-guiding plate 14, is provided at the right temple member 20 and located near the right-side head part of the user in the wearing state. The left case member 13, which is a unit related to image display by the left light-guiding plate 15, is provided at the left temple member 21 and located near the left-side head part of the user in the wearing state.

The display 10 includes a non-illustrated light-guiding member and a display element. The right case member 12 and the left case member 13 store a part of the display 10 at both ends in a horizontal direction of the display 10, and configure a part of the display unit.

The right light-guiding plate 14 and the left light-guiding plate 15 of the first embodiment are optical units formed of a light transmissive resin or the like, and are constituted by a prism, for example. The right light-guiding plate 14 and the left light-guiding plate 15 guide image light output from the right case member 12 and the left case member 13 to the eyes of the user.

The display 10 is configured to guide image light generated by image emission devices described below of the right case member 12 and the left case member 13, respectively, to the right light-guiding plate 14 and the left light-guiding plate 15 to cause the image light to allow the user to view a virtual image. That is, outside light coming from the front of the user passes through the right light-guiding plate 14 and the left light-guiding plate 15 to be incident on the eyes of the user.

Here, the left case member 13 will be described. FIG. 4 is an exploded perspective view of a portion of the left case member 13. Note that only the left case member 13 will be described here because the right case member 12 is provided symmetrically with the left case member 13.

As illustrated in FIG. 4, the left case member 13 includes an upper housing 50, an inner housing 51 integrally attached to an end portion of the display 10, and a lower housing 52.

The upper housing 50 includes an upper face portion 53 that covers an upper face of the inner housing 51, and an inner side face portion 54 that covers an inside of the inner housing 51. The lower housing 52 includes a lower face portion 55 that covers a lower face of the inner housing 51.

A temple support portion 56 is provided, close to the display 10, at an end portion of the inner side face portion 54 of the upper housing 50.

The temple support portion 56 is provided, close to the display 10, at a midway portion in a front and rear direction of the left case member 13 of the display 10. That is, a part of the left case member 13 is also present rearward of the temple support portion 56.

The inner housing 51 houses an image emission device 18 that constitute a part of the display unit.

The right temple member 20 is provided, at a side end portion of the display 10, with a support portion 28 for attaching to the temple support portion 56. The right temple member 20 engages the support portion with the temple support portion 56 to be pivotally attached to the temple support portion 56 of the right case member 12. That is, the right temple member 20 is provided, close to the display 10, inside the right case member 12 in a manner along the right case member 12.

The right temple member 20 includes a base portion 22 that is vertically wide and coupled to the front portion frame 11, and is tapered rearward from the base portion 22. The base portion 22 includes an opening portion 23 of an approximately square shape and an elastic portion 24 located at the opening portion 23, where the base portion 22 of the elastic portion 24 is coupled to a side end of the front portion frame 11.

The elastic portion 24 is formed in an approximate U shape including an upper portion side 25 and a lower portion side 26, and has a shape in which a rear end portion of the elastic portion 24 protrudes outward from the base portion 22. The rear end of the elastic portion 24 is abutted against an inner side face of the right case member 12.

An abutment arm 34 extending in a circumferential direction is provided at an upper portion of a main body portion 31. A lower face of the abutment arm 34 is an abutment face 35 that comes into contact with the glass frame of the user.

A right support member 30 engages an engagement groove with a protrusion 27 to cause the main body portion 31 to be pivotally held about the protrusion 27, thus configuring a right pivot mechanism 36 as a first pivot mechanism.

That is, the pivoting of the main body portion 31 allows the abutment arm 34 to be pivotable between a first position illustrated in FIG. 2 at which the abutment arm 34 extends in a direction in which the right temple member 20 and the left temple member 21 face each other and a second position illustrated in FIG. 1 at which the abutment arm 34 extends along the right temple member 20. At this time, a concavo-convex face 32 formed at an outer peripheral face of the main body portion 31 enables to prevent a slippage when a pivotal operation is performed. The first position is a position at which the glass frame of the user is supported.

The right support member 30 is disposed, at the first position, at a position overlapping the display 10 when viewed in an emission direction of the image light. That is, the right support member 30 is configured, at the first position, such that the abutment arm 34 protrudes inward of the right temple member 20.

Next, the support members will be described.

As illustrated in FIG. 5, a pair of upper and lower protrusions 27 serving as rotation shafts are formed inside the upper portion side 25 and the lower portion side 26 of the elastic portion 24. A plurality of the protrusions 27 are provided in a front and rear direction of the elastic portion 24.

Figure 7:
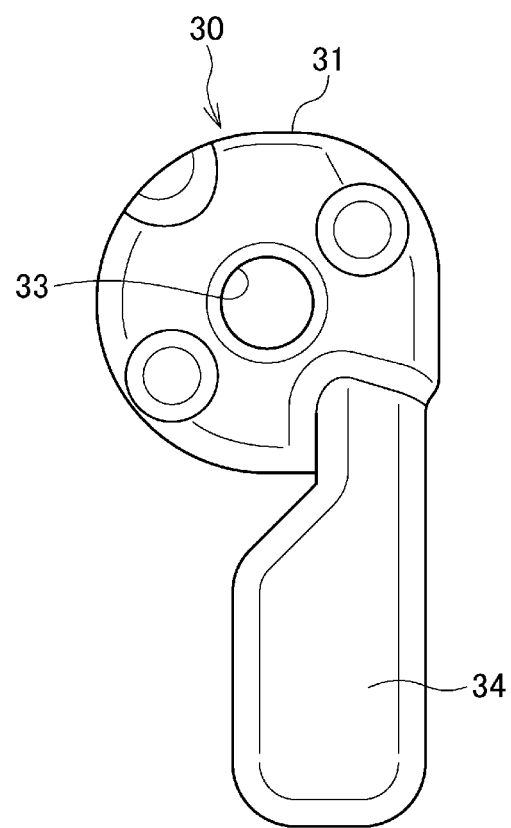
FIG. 7 is a plan view illustrating a support member in a first embodiment.

As illustrated in FIG. 6, the right support member 30 as a first support member includes the main body portion 31 formed in a shape in which a part of a cylindrical peripheral face is cut out. A plurality of the concavo-convex faces 32 extending in an up and down direction are formed at the outer peripheral face of the main body portion 31. As illustrated in FIG. 7, engagement concave portions 33 to be engaged with the protrusions 27 are formed at an upper and lower faces of the main body portion 31, respectively.

The abutment arm 34 extending in the circumferential direction is provided at the upper portion of the main body portion 31. The lower face of the abutment arm 34 is the abutment face 35 that comes into contact with the glass frame of the user.

The right support member 30 engages the engagement groove with the protrusion 27 to cause the main body portion 31 to be pivotally held about the protrusion 27, thus configuring the right pivot mechanism 36 as the first pivot mechanism.

That is, the pivoting of the main body portion 31 allows the abutment arm 34 to be pivotable between the first position illustrated in FIG. 2 at which the abutment arm 34 supports the glass frame of the user and the second position illustrated in FIG. 1 at which the abutment arm 34 extends along the right temple member 20. At this time, the concavo-convex face 32 formed at the outer peripheral face of the main body portion 31 enables to prevent a slippage when a pivotal operation is performed.

The right support member 30 is disposed, at the first position, at a position overlapping the display 10 when viewed in the emission direction of the image light. That is, the right support member 30 is configured, at the first position, such that the abutment arm 34 protrudes inward of the right temple member 20.

Further, the right support member 30 is also pivotable to a third position at which the abutment arm 34 is pivoted so as to extend toward a side of the right case member 12. The right support member 30 is pivoted to the third position to allow the abutment arm 34 to be held in a state extending toward the right case member 12, thus making an elastic force of the elastic portion 24 variable.

Moreover, in the right support member 30, a position of the protrusion 27 with which the engagement concave portion 33 engages is changed to change a front and rear position of the right support member 30.

Accordingly, when, for example, the right support member 30 is located most frontward, the right support member 30 does not come in contact with the right case member 12 and the elastic portion 24 has an inherent elastic force. Then, when the right support member 30 is located rearward, the main body portion 31 of the right support member 30 abuts against a side face of the right case member 12, thus putting a load on the elastic portion 24. Accordingly, the right support member 30 is located rearward, then the elastic force of the elastic portion 24 is increased, compared to when the right support member 30 is located frontward.

A left support member 37 as a second support member is configured as in the right support member 30.

That is, the left support member 37 includes the main body portion 31, the engagement concave portion 33, and the abutment arm 34, and the left support member 37 engages the engagement groove with the protrusion 27 of the elastic portion 24 to configure a left pivot mechanism 38 as a second pivot mechanism.

The rest of the configuration is the same as the right support member 30 having a left/right symmetrical configuration with the left support member 37, and an explanation of the rest is thus omitted.

Next, operations and advantageous effects of the first embodiment will be described.

In the first embodiment, when the user does not use glasses, the right support member 30 and the left support member 37 are located at the second position illustrated in FIG. 1.

Accordingly, the abutment arms 34 of the right support member 30 and the left support member 37 extend along the right temple member 20 and the left temple member 21, and are held in a state of not protruding inward.

When the user uses glasses, the right support member 30 and the left support member 37 are located at the first position illustrated in FIG. 2.

This allows the abutment arms 34 of the right support member 30 and the left support member 37 to be held in a state of protruding inward of the right temple member 20 and the left temple member 21. Further, the user wears the HMD 1, then the abutment face 35 of the abutment arm 34 of the right support member 30 abuts against the glass frame of the user and the abutment face 35 of the abutment arm 34 of the left support member 37 abuts against the glass frame of the user.

The HMD 1 is supported by the glass frame of the user via the abutment face 35, improving wearing properties of the HMD 1 even when the user uses glasses.

As described above, in the first embodiment, the right temple member 20 (the first temple member) and the left temple member 21 (the second temple member) are provided, close to the display unit, at the inner side faces of the right case member 12 and the left case member 13 (the case member) that store at least a part of the display 10. The right support member 30 (the first support member) and the left support member 37 (the second support member) are provided at the right temple member 20 and the left temple member 21.

Accordingly, the provision of the right support member 30 and the left support member 37 enables to adjust a degree of opening and an inward repulsive force of the right temple member 20 and the left temple member 21.

In addition, in the first embodiment, the display 10 includes a light-guiding member and a display element, and the right case member 12 and the left case member 13 store a part of the display 10 at both ends in the horizontal direction of the display 10.

Further, in the first embodiment, the right support member 30 is provided at the right temple member 20 provided on a side of the display 10 in the right case member 12, and the left support member 37 is provided at the left temple member 21 provided on a side of the display 10 in the left case member 13.

Accordingly, the user using glasses wears the HMD 1, then the glass frame of the user supports the right support member 30 provided at the right temple member 20 and the left support member 37 provided at the left temple member 21. This makes it possible to improve the wearing properties of the HMD 1 even when the user uses glasses.

Further, in the first embodiment, the right support member 30 and the left support member 37 are arranged at positions overlapping the display 10 when viewed in the emission direction of the image light.

Accordingly, the right support member 30 and the left support member 37 protrude inward of the right temple member 20 and the left temple member 21, which enables the glass frame of the user to support the HMD 1.

Further, in the first embodiment, the right support member 30 and the left support member 37 are provided on a center side in a width direction of the right temple member 20 and the left temple member 21.

This allows the right support member 30 and the left support member 37 to support the HMD 1 at the glass frame of the user near a center in the width direction of the right temple member 20 and the left temple member 21.

Further, in the first embodiment, the right temple member 20 and the left temple member 21 includes, at center portions of the right temple member 20 and the left temple member 21, the elastic portions 24 extending toward the right case member 12 and the left case member 13.

Accordingly, the elastic portions 24 come into contact with the right support member 30 or the left support member 37, which enables to adjust a degree of opening and the inward repulsive force of the right temple member 20 and the left temple member 21.

Further, in the first embodiment, the right support member 30 and the left support member 37 include the right pivot mechanism 36 (the first pivot mechanism) and the left pivot mechanism 38 (the second pivot mechanism) that are rotationally movable between the first position and the second position.

Accordingly, the right pivot mechanism 36 and the left pivot mechanism 38 cause the right support member 30 and the left support member 37 to be located at the first position or the second position, then the right support member 30 and the left support member 37 are brought into a protruding state or a stored state.

Further, in the first embodiment, the right pivot mechanism 36 and the left pivot mechanism 38 are provided at the elastic portions 24.

This allows the right pivot mechanism 36 and the left pivot mechanism 38 provided at the elastic portions 24 to cause the right support member 30 and the left support member 37 to be located at the second position or the first position.

Further, in the first embodiment, the right support member 30 and the left support member 37 are pivotable to the third position at which the right support member 30 and the left support member 37 extend toward sides of the right case member 12 and the left case member 13.

Accordingly, the right support member 30 and the left support member 37 are pivoted to the third position, then the right support member 30 and the left support member 37 are held in a state of extending toward the right case member 12 and the left case member 13, making the elastic force of the elastic portions 24 variable.

Further, in the first embodiment, the right support member 30 and the left support member 37 include the main body portion 31, and the abutment face 35, on an upper side of the main body portion 31, that abuts against the glass frame of the user to support the display 10.

Accordingly, the abutment faces 35 of the right support member 30 and the left support member 37 abut against the glass frame of the user, which enables the glass frame of the user to support the HMD 1 via the abutment face 35.

Accordingly, the user using glasses wears the HMD 1, then the abutment faces 35 of the right support member 30 and the left support member 37 abut against the glass frame of the user, which allows the glass frame of the user to support the HMD 1 via the abutment face 35. This makes it possible to improve the wearing properties of the HMD 1 even when the user uses glasses.

Next, a second embodiment of the present disclosure will be described.

Figure 8:
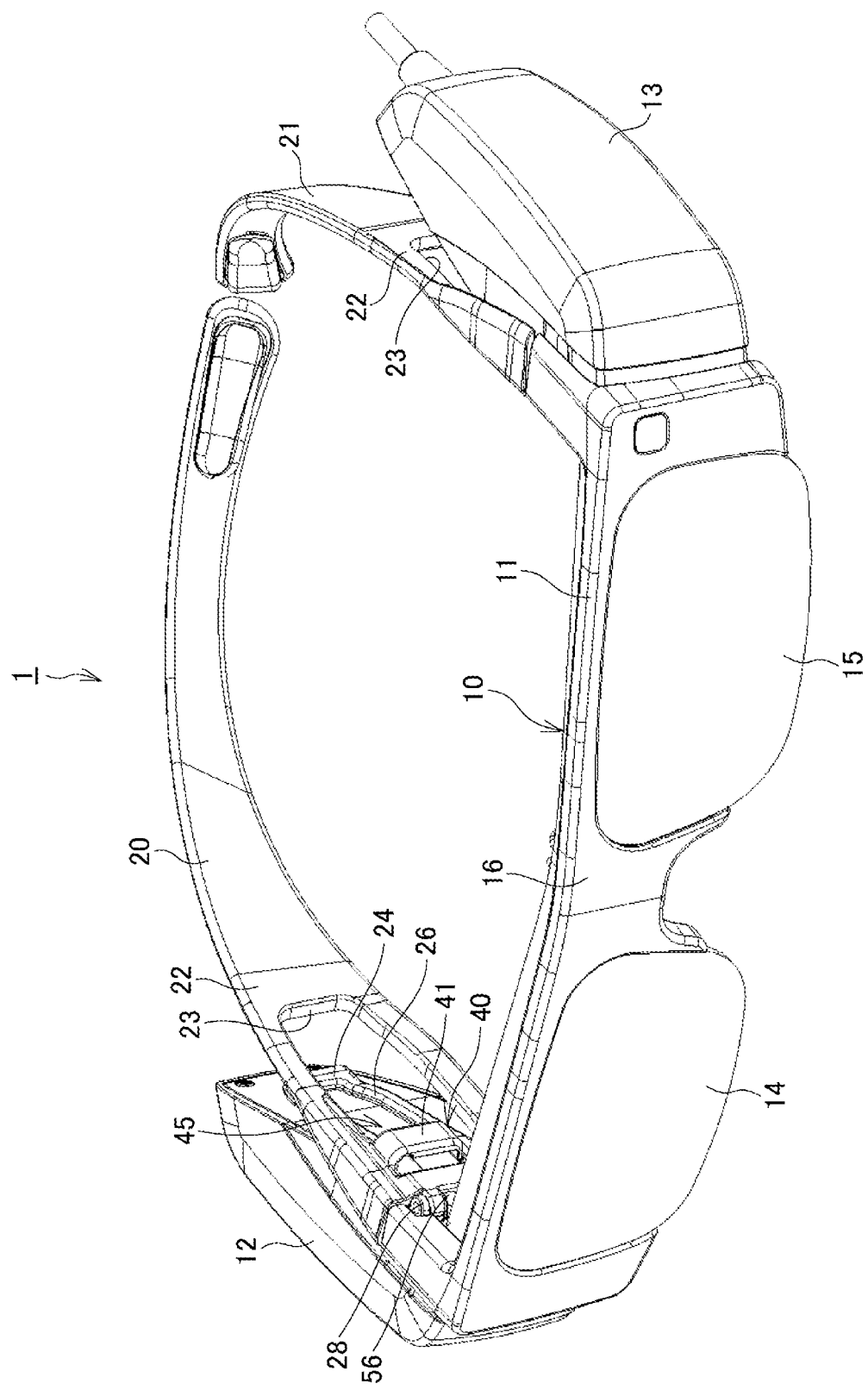
FIG. 8 is a perspective view of a second position state in a second embodiment.
Figure 9:
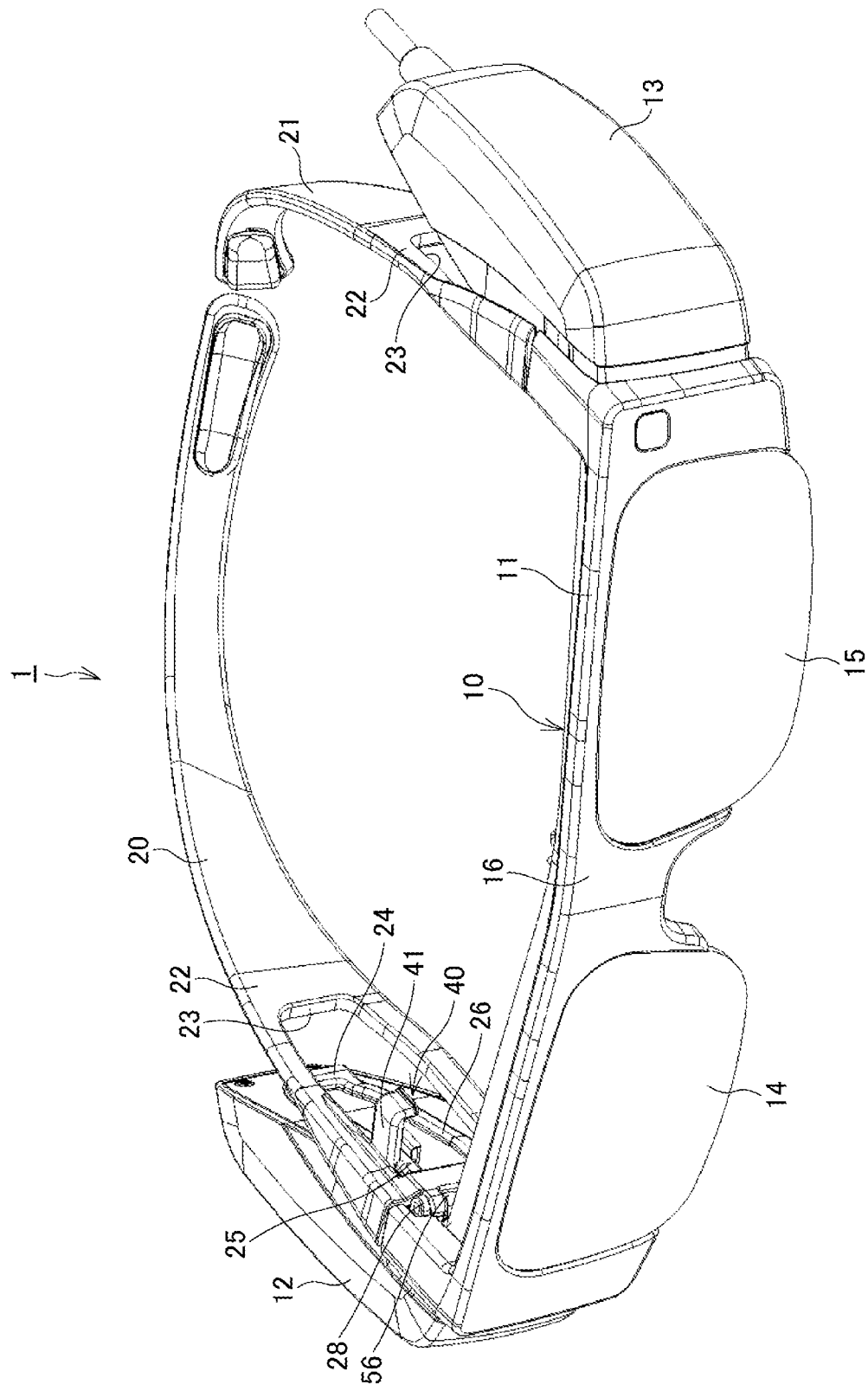
FIG. 9 is a perspective view of a first position state in a second embodiment.
Figure 10:
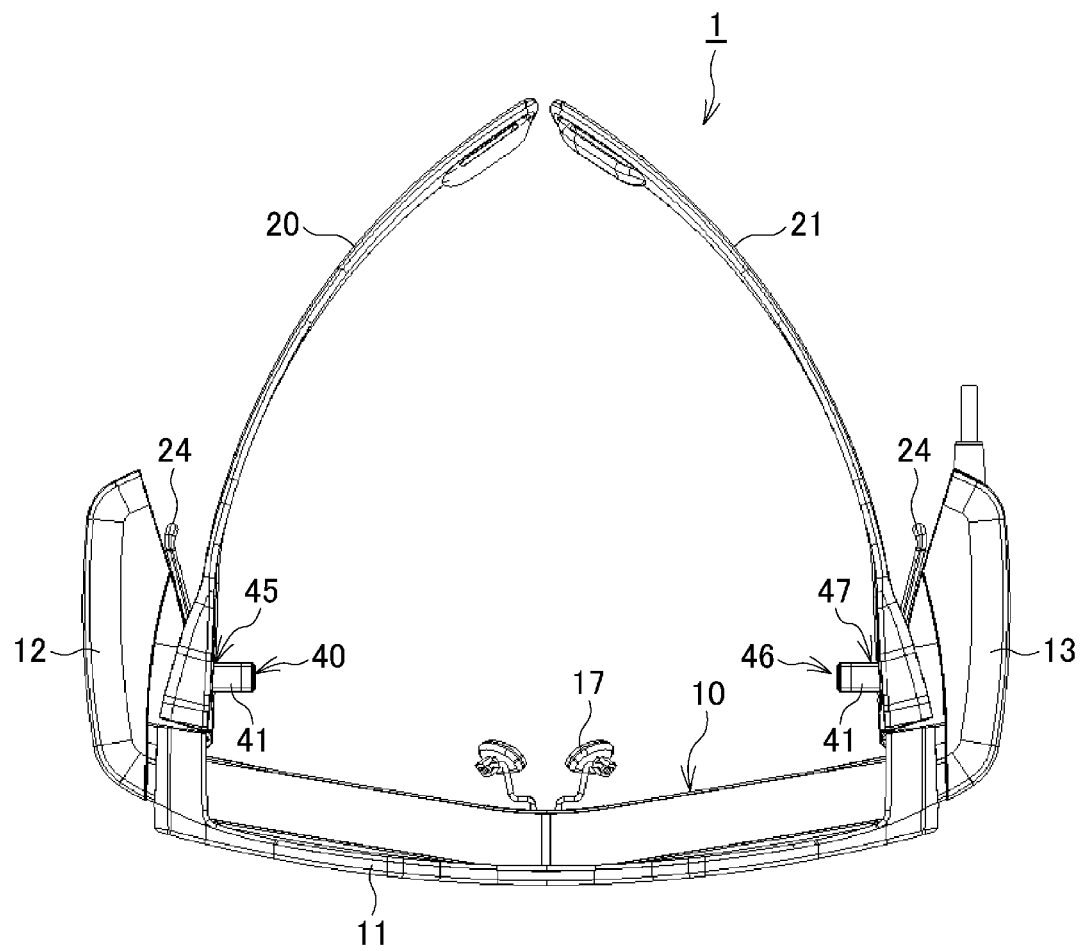
FIG. 10 is a plan view in a second embodiment.
Figure 11:
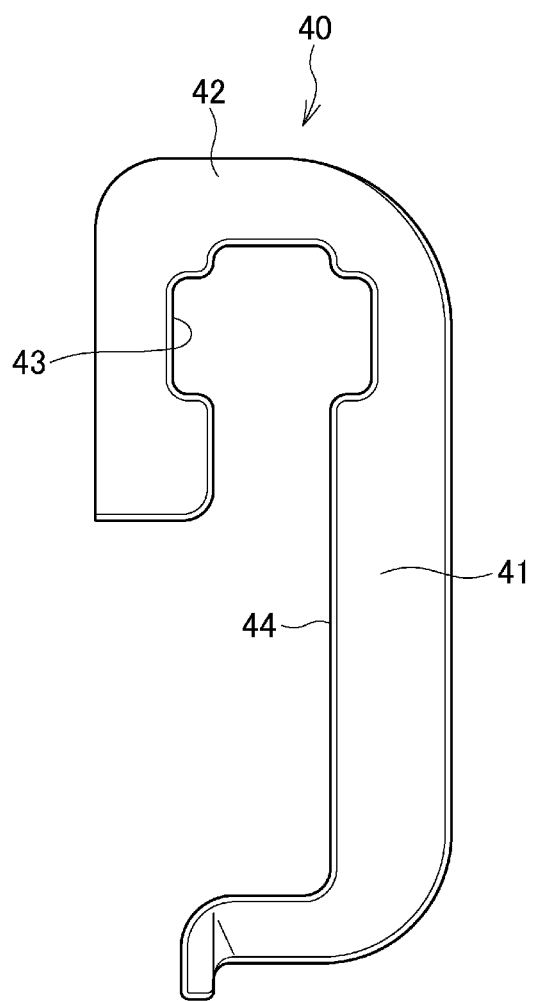
FIG. 11 is a front view illustrating a support member in a second embodiment.

FIG. 8 is a perspective view of a second position state illustrating the second embodiment of the present disclosure. FIG. 9 is a perspective view of a first position state illustrating the second embodiment. FIG. 10 is a plan view illustrating the second embodiment. FIG. 11 is a front view illustrating a support member of the second embodiment.

As illustrated in FIGS. 8 to 10, a right support member 40 as the first support member of the second embodiment includes a main body portion 41 of a flat plate shape, and an engagement portion 42 of an approximate U shape integrally provided at an upper end portion of the main body portion 41.

The upper portion side 25 of the elastic portion 24 is formed in an approximate square cross-sectional shape. A engagement groove 43 to be engaged with the upper portion side 25 of the elastic portion 24 is formed inside the engagement portion 42. The engagement groove 43 is formed in a cross-sectional shape that is approximately the same as the cross-sectional shape of the upper portion side 25 of the elastic portion 24.

The right support member 40 is pivotable between a first position illustrated in FIG. 9 at which the right support member 40 engages the engagement groove 43 of the engagement portion 42 with the upper portion side 25 of the elastic portion 24 to support the glass frame of the user, and a second position illustrated in FIG. 8 at which the right support member 40 extends along the right temple member 20. In the right support member 40, a lower face of the main body portion 41 functions as an abutment face 44 in a state where the right support member 40 is located at the first position.

That is, in the first embodiment, the right pivot mechanism 36 performs a rotation operation in a lateral direction with the protrusion 27 being a shaft, while in the second embodiment, a right pivot mechanism 45 as the first pivot mechanism in which the main body portion 41 performs a pivotal operation in the up and down direction.

In this case, in the second embodiment, because the cross-sectional shape of the engagement groove 43 is substantially equivalent to the cross-sectional shape of the upper portion side 25 of the elastic portion 24, the right support member 40 can be held at the first position and the second position. Further, at least the right support member 40 is composed of a flexible material such as resin, then the right support member 40 is deformed and overrides a corner portion of the upper portion side 25 of the elastic portion 24 to enable a movement between the first position and the second position.

A left support member 46, which is similar in configuration to the right support member 40, includes the main body portion 41, the engagement portion 42, the engagement groove 43, and the abutment face 44, configuring a left pivot mechanism 47.

Because the other configurations are similar to those in the first embodiment, the same components are denoted by the same reference signs and descriptions of those components will be omitted.

In the second embodiment as well, when the user does not use glasses, the right support member 40 and the left support member 46 are located at the second position illustrated in FIG. 8, as in the first embodiment.

Accordingly, the main body portions 41 of the right support member 40 and the left support member 46 extend along the right temple member 20 and the left temple member 21, and are held in a state of not protruding inward.

When the user uses glasses, the right support member 40 and the left support member 46 are located at the first position illustrated in FIG. 9.

Accordingly, the main body portions 41 of the right support member 40 and the left support member 46 are held in a state of protruding inward of the right temple member 20 and the left temple member 21. Then, the user wears the HMD 1, then an abutment face of the right support member 40 abuts against the glass frame of the user and an abutment face of the left support member 46 abuts against the glass frame of the user.

The HMD 1 is supported by the glass frame of the user via the abutment face, improving the wearing properties of the HMD 1 even when the user uses glasses.

As described above, in the second embodiment, the right temple member 20 (the first temple member) and the left temple member 21 (the second temple member) are provided, close to the display unit, at the inner side faces of the right case member 12 and the left case member 13 (the case member) that store at least a part of the display 10. The right support member 40 (the first support member) and the left support member 46 (the second support member) are provided at the right temple member 20 and the left temple member 21.

Further, the right support member 40 and the left support member 46 include the right pivot mechanism 45 (the first pivot mechanism) and the left pivot mechanism 47 (the second pivot mechanism) that are rotationally movable between the first position and the second position.

Accordingly, the provision of the right support member 40 and the left support member 46 enables to adjust a degree of opening and the inward repulsive force of the right temple member 20 and the left temple member 21.

In addition, when the user does not use glasses, the right pivot mechanism 45 and the left pivot mechanism 47 cause the right support member 40 and the left support member 46 to be located at the second position. Further, when the user uses glasses, the right pivot mechanism 45 and the left pivot mechanism 47 cause the right support member 40 and the left support member 46 to be located at the first position, then the right support member 40 and the left support member 46 abut against the glass frame of the user to support the HMD 1. This makes it possible to improve the wearing properties of the HMD 1 even when the user uses glasses.

What is claimed is:

1. A head-mounted display apparatus, comprising:
   a display unit;
   a first case member and a second case member each configured to store at least a part of the display unit;
   a first temple member and a second temple member respectively provided at an inner side face of the first case member and an inner side face of the second case member, and provided adjacently to the display unit; and
   a first support member and a second support member respectively provided at the first temple member and the second temple member, and respectively pivotable with respect to the first case member and the second case member, wherein
   the first support member and the second support member respectively include a first pivot mechanism and a second pivot mechanism,
   the first pivot mechanism and the second pivot mechanism are pivotable between a first position and a second position,
   the first position is a position at which the first support member and the second support member respectively protrude away from the first temple member and the second temple member, and
   the second position is a position at which the first support member and the second support member are respectively stored in the first temple member and the second temple member.

2. The head-mounted display apparatus according to claim 1, wherein
   the display unit includes a light-guiding member and a display element, and
   the first case member and the second case member are respectively configured to partly store two opposite ends of the display unit.

3. The head-mounted display apparatus according to claim 1, wherein
   the first support member is provided adjacent to the display unit, and
   the second support member is provided adjacent to the display unit.

4. The head-mounted display apparatus according to claim 1, wherein
   the first support member and the second support member are respectively arranged at two positions overlapping the display unit when viewed from a front side of the display unit.

5. The head-mounted display apparatus according to claim 3, wherein
   the first support member and the second support member are respectively provided on a center portion of the first temple member and a center portion of the second temple member.

6. The head-mounted display apparatus according to claim 1, wherein
   the first temple member includes, at a center portion of the first temple member, an elastic portion extending toward the first case member, and
   the second temple member includes, at a center portion of the second temple member, an elastic portion extending toward the second case member.

7. The head-mounted display apparatus according to claim 6, wherein
   the first pivot mechanism and the second pivot mechanism are respectively provided at the elastic portion of the first temple member and the elastic portion of the second temple member.

8. The head-mounted display apparatus according to claim 1, wherein
   the first support member and the second support member each includes:
   a main body portion, and
   an abutment face, on an upper side of the main body portion, that abuts against a glass frame of a user to support the display unit.

* * * * *